(12) United States Patent
Pfister

(10) Patent No.: US 7,682,045 B2
(45) Date of Patent: Mar. 23, 2010

(54) LINEAR ACTUATOR OF THE SCREW-NUT TYPE

(75) Inventor: Jean-Francois Pfister, Sonceboz (CH)

(73) Assignee: Societe Industrielle de Sonceboz S.A., Sonceboz (CH)

( * ) Notice: Subject to any disclaimer, the term of this patent is extended or adjusted under 35 U.S.C. 154(b) by 258 days.

(21) Appl. No.: 11/975,500

(22) Filed: Oct. 19, 2007

(65) Prior Publication Data

US 2008/0130310 A1    Jun. 5, 2008

(30) Foreign Application Priority Data

Nov. 30, 2006    (EP)    ................... 06405502

(51) Int. Cl.
*F21V 21/26*    (2006.01)
(52) U.S. Cl. .................. 362/273; 362/528; 310/20; 310/80; 74/216.3
(58) Field of Classification Search ................ 362/273, 362/289, 513, 526; 310/20, 80; 74/216.3
See application file for complete search history.

(56) References Cited

U.S. PATENT DOCUMENTS 3,660,704 A * 5/1972 Paine et al. ............... 310/80

| 5,213,000 | A | 5/1993 | Saya et al. |
| 5,554,899 | A * | 9/1996 | Teramachi ............... 310/80 |
| 6,453,761 | B1 * | 9/2002 | Babinski ............... 74/89.34 |
| 6,603,229 | B1 * | 8/2003 | Toye, IV ............... 310/90 |
| 6,641,292 | B2 | 11/2003 | Miki et al. |
| 7,040,788 | B2 * | 5/2006 | Brazas et al. ............... 362/512 |
| 7,223,001 | B2 * | 5/2007 | Pfister et al. ............... 362/523 |
| 7,420,303 | B2 * | 9/2008 | Nishimura ............... 310/90 |
| 2003/0111924 | A1 * | 6/2003 | Ma et al. ............... 310/168 |
| 2005/0046291 | A1 | 3/2005 | Suzuki et al. |
| 2005/0174796 | A1 | 8/2005 | Pfister et al. |
| 2006/0108885 | A1 | 5/2006 | Nishimura |

FOREIGN PATENT DOCUMENTS

| DE | 41 28 110 A1 | 2/1993 |
| EP | 0 743 464 A1 | 11/1996 |
| FR | 2 155 701 | 5/1973 |
| JP | 55 139048 | 10/1980 |

* cited by examiner

*Primary Examiner*—Ali Alavi
(74) *Attorney, Agent, or Firm*—Baker & Daniels LLP

(57) ABSTRACT

A linear actuator (1) comprising a housing (6), a motor (2) comprising a stator with coils (4), a screw-nut system, and a rotor (5) axially and radially supported on the motor side by a bearing (11). The bearing comprises a ball (14) rigidly attached to the rotor, a cylindrical cavity (15) formed or positioned in the housing into which the ball (14) is inserted. A stop (17) is positioned in the cavity, supported in an axial direction of the rotor, against the ball (14) in essentially one point.

19 Claims, 4 Drawing Sheets

LINEAR ACTUATOR OF THE SCREW-NUT TYPE

FIELD OF THE INVENTION

The present invention relates to a linear actuator of the screw-nut type.

BACKGROUND OF THE INVENTION

Linear actuators are used in many different applications. In the automotive field, linear actuators are used, inter alia, for positioning headlights in the horizontal and vertical planes, as described in publications U.S. Pat. No. 6,641,292, US 2005/0046291, and US 2005/0174796. The devices described in these publications include a stepping motor driving a screw-nut system for the linear displacement of a screw shaft. With the stepping motor, it is possible to displace and position the screw shaft rapidly, with few mechanical parts and by using a relatively simple control.

In the field of automobile headlight adjustment, it is important to have a high performance, reliable and dynamic screw-nut system, while using compact, lightweight and economical components. Components used in automobiles should moreover perform even under extreme environmental conditions, in particular for ranges of temperatures from −40° C. to 120° C.

In conventional actuators, the torque to be exerted by the rotor on the member to be displaced decreases when the temperature decreases, because of the increase of frictional forces in the bearings positioned between the rotor and the stator. This is due to the increase in the viscosity of the lubricants present in the bearings. Although certain lubricants have an acceptable viscosity at a very low temperature, the latter are either expensive or unacceptable for ecological reasons.

Another disadvantage of the aforementioned conventional actuators is the mechanical play that occurs when the displacement direction of the linear member is changed, this play being detrimental to the positioning accuracy of the headlights, as well as causing vibration and wear of the components.

US 2006/0108885 A1 discloses a motor with ball bearings, intended for consumer electronics applications. This motor is however not suitable for a linear actuator application in the automotive field because of the instability of the bearings. Indeed, the balls are housed in cavities of parts assembled in the housing of the motor, the balls being in abutment against an essentially spherical surface at the ends of the axis of the motor, but in a separable manner. In the case of vibration or shock, the interface between the balls and the ends of the axes may separate and even be fouled and worn, thereby leading not only to the possibility of radial vibration of the motor, but also to decentralization of the rotor. Moreover, the shape of the housing in which the balls are mounted, is sensitive to wear and positioning of the balls and requires accurate manufacturing and mounting tolerances.

BRIEF SUMMARY OF THE INVENTION

In view of the foregoing, an object of the invention is to provide a good performing, reliable, compact and economical linear actuator.

A specific object of the invention is to provide a good performing, reliable, and economical linear actuator over a large temperature range, in particular including low temperatures.

A further object is to provide a device having few parts which may be easily assembled so as to reduce the manufacturing and assembling costs.

Another object is to provide an economical and lightweight but wear-resistant linear actuator.

In the present invention, an actuator for linear displacement of a member to be controlled, includes a housing, a motor and a screw-nut system. The motor, which is preferably a stepping motor, comprises a stator including drive coils and a rotor including permanent magnets, the rotor being supported at one of its ends, opposite to the member to be displaced, by a bearing in the form of a spherical or non-spherical ball integral with or rigidly attached to the rotor and inserted into an essentially cylindrical cavity of the housing. The ball is axially supported essentially at a point on the axis of rotation, against a hard surface of a stop positioned in the cavity. Preferably, the ball is in the form of a conventional spherical ball as used in ball bearings, welded or adhesively bonded to the rotor. Thus, a bearing with great hardness and geometrical accuracy may be provided to support and accurately position the rotor in the radial and axial directions.

According to a preferred embodiment of the invention, a screw of the screw-nut system is integral with the rotor, the linear displacement member being provided with a nut which engages with the screw, the screw being supported by a second bearing at the opposite end of the bearing on the rotor side. The bearing at the end of the screw preferably also comprises a spherical or non-spherical ball, integral with or rigidly attached to the rotor, and inserted into an essentially cylindrical cavity of the housing, the ball being axially supported essentially at a point on the axis of rotation, against a hard surface of a stop positioned in the cavity. Preferably, the ball of the second bearing may also be in the form of a conventional spherical ball as used in ball bearings, welded or adhesively bonded to the rotor.

A spring, preferably a coil spring, is positioned in one of the cylindrical cavities, between a wall of one end of the cavity and the stop which is mobile and supported against the ball, in order to remove the play in the axial positioning of the screw.

With the small radius of the balls and their small surfaces in contact with the cavities of the housing and the stops, it is possible to have a very low friction coefficient, notably a very low resistance coefficient in the presence of a lubricant of the bearing which opposes the motor torque. It is advantageous to have balls and stops with great surface hardness in order to reduce the friction coefficient and wear. The surface hardness of the balls and the stops is larger than 50 Rockwell C scale units, preferably larger than 60 Rockwell C units, for example 65 Rockwell C units or more.

The cylindrical bearing in the housing, as a cavity, is easy to manufacture with accuracy and may also be used for housing and guiding a coil spring. This arrangement also allows mounting in an axial direction (parallel to the axis of rotation of the rotor) of the various members composing the actuator (the housing, the stator and the rotor) in an easily automatable way and with few operations.

The linear displacement unit may advantageously comprise at least two portions either separate or joined by a hinge and which may be rapidly and easily assembled around the screw. In an alternative, the linear displacement unit may even be assembled on the screw after assembling the rotor in the housing.

The linear displacement unit may advantageously be made of injected plastic material and provided with attachment means such as elastic clips attaching both portions automatically when they are assembled around the screw. These two portions comprise threaded portions complementary to the threading of the screw so as to form a nut once they are assembled.

Other objects and advantageous features of the invention will be apparent from the claims, the description and the appended drawings.

BRIEF DESCRIPTION OF THE DRAWINGS

FIG. 1b is a sectional view of the embodiment according to FIG. 1a;

DETAILED DESCRIPTION OF EMBODIMENTS

Figure 1A:
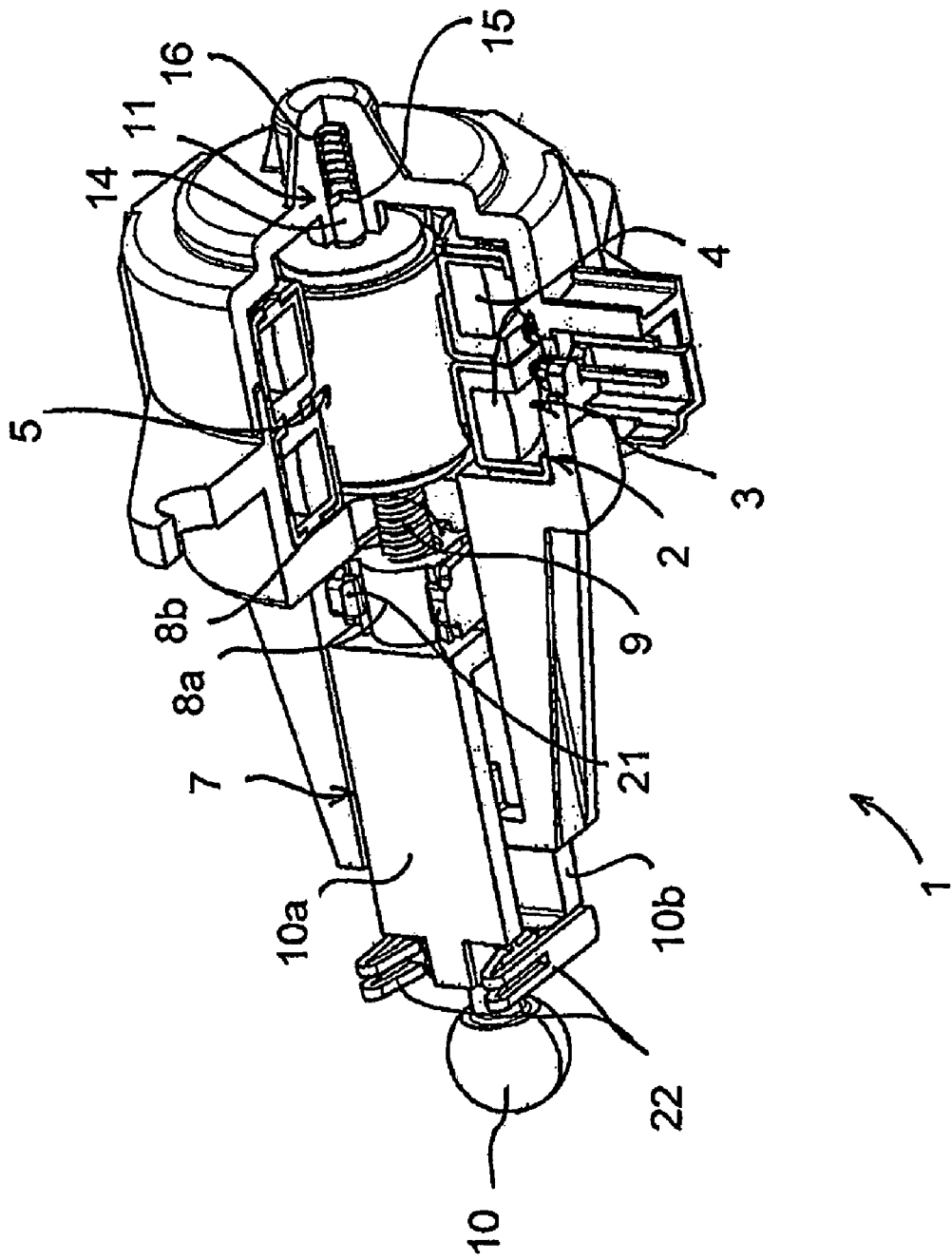
FIG. 1a is a partial sectional and perspective view of a linear actuator according to an embodiment of the invention.

With reference to the figures, an actuator 1, 1', 1", comprises a motor 2, preferably a stepping motor, a stator 3 comprising one or more coils 4, a rotor 5, a housing 6 in which the stator and rotor are mounted, a linear displacement unit 7, 7', 7" with a threaded nut portion 8, 8', 8" mounted on a screw portion 9, integral with and extending from the rotor 5. The linear displacement unit 7, 7', 7" includes a coupling portion 10, 10' for its connection to a unit to be controlled, such as the removable support of an automobile headlight. The linear displacement unit 7, 7', 7" comprises one or two non-axisymmetrical surfaces engaging complementary surfaces of the housing in order to prevent rotation of the linear displacement unit. Setting the rotor 5 into rotation therefore causes rotation of the screw portion 9 and imposes an axial linear movement to the linear displacement unit by screwing, unscrewing, respectively.

The use of a stepping motor is advantageous since the position of the unit to be controlled may thereby be easily and rapidly adjusted in a compact and inexpensive design. Other types of reversible motors may nevertheless be used in the present invention.

Support and guiding of the rotor 5 are provided by bearings 11, 12 positioned at one end of the rotor 13a opposite to the displacement unit 7, 7', 7" and at the free end 13b of the screw portion 9. In the illustrated embodiments, the bearing 11 on the rotor side comprises a ball 14 received in a cylindrical cavity 15 formed in the housing 6, which is closed on one side. In the cavity 15 of the bearing 11, a spring 16, preferably a coil spring, is housed, pressing a removable stop 17 against the ball 14. This spring is used to compensate the play between the screw portion 9 and the nut portion 8. The ball 14 may advantageously be a conventional ball as used in ball bearings, these balls being inexpensive and having great surface hardness and great geometrical accuracy. The ball is preferably welded at the end 13a of the rotor 5, but other attachment means such as adhesive bonding of the ball to the rotor may also be contemplated.

It is also possible to machine the balls integrally with the rotor, notably the screw.

The small diameter of the ball and the small surface in contact with the cylindrical surface of the cavity of the bearing 15 as well as with the removable stop 17, allows the resistance torque due to friction to be reduced to a minimum. Indeed, the tangential velocity of the ball in contact with the wall of the cavity is low and the point of application of the frictional force is very close to the axis of rotation, respectively on the axis of rotation as regards the axial stop. The resistance torque due to the friction exerted by a viscous lubricant at low temperatures will therefore have a very small impact on the performance of the actuator. The accuracy of radial positioning of the motor is nevertheless very high and the assembling of the rotor is very easy, whereby the insertion of the spring, of the rotor and of the stator into the housing may to be carried out in an axial direction, i.e. along the axis of rotation A. For this purpose, the housing 6 comprises two portions, 6a, 6b, with an essentially coaxial interface 18 positioned around the coils 4.

The bearing 12 at the other end, i.e. on the screw side, is also preferably formed with a ball 14, preferably welded or adhesively bonded onto the end 13b of the screw 9, the ball being inserted into a cylindrical cavity 19 formed in a portion of the housing. This cavity 19 is also closed on one side and provided with a stop 20 which preferably is in hard material, such as steel, being used as an axial support of the ball in opposition to the linear force exerted by the spring 16 and the linear displacement unit 7, 7', 7".

Figure 1B:
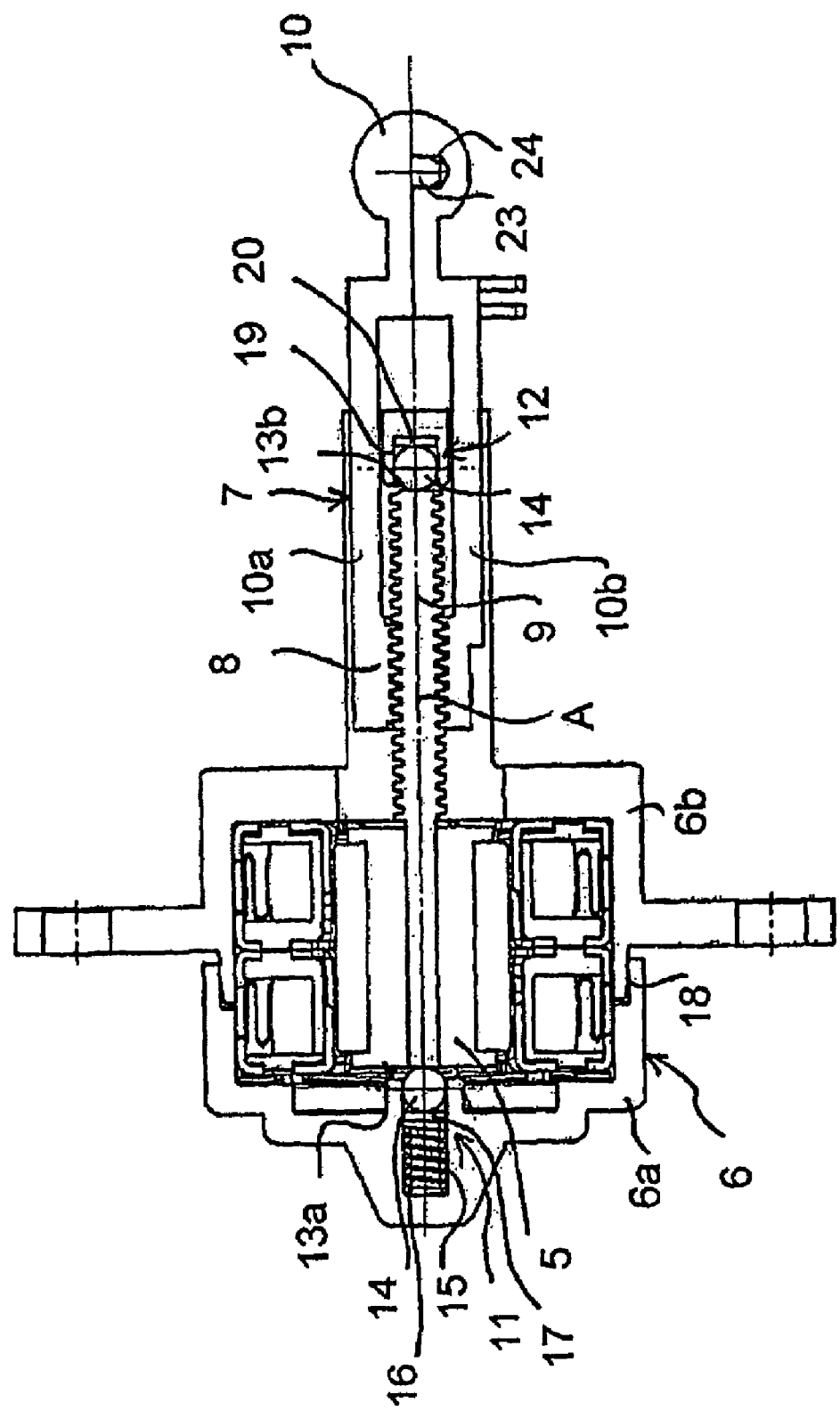
Figure 2:
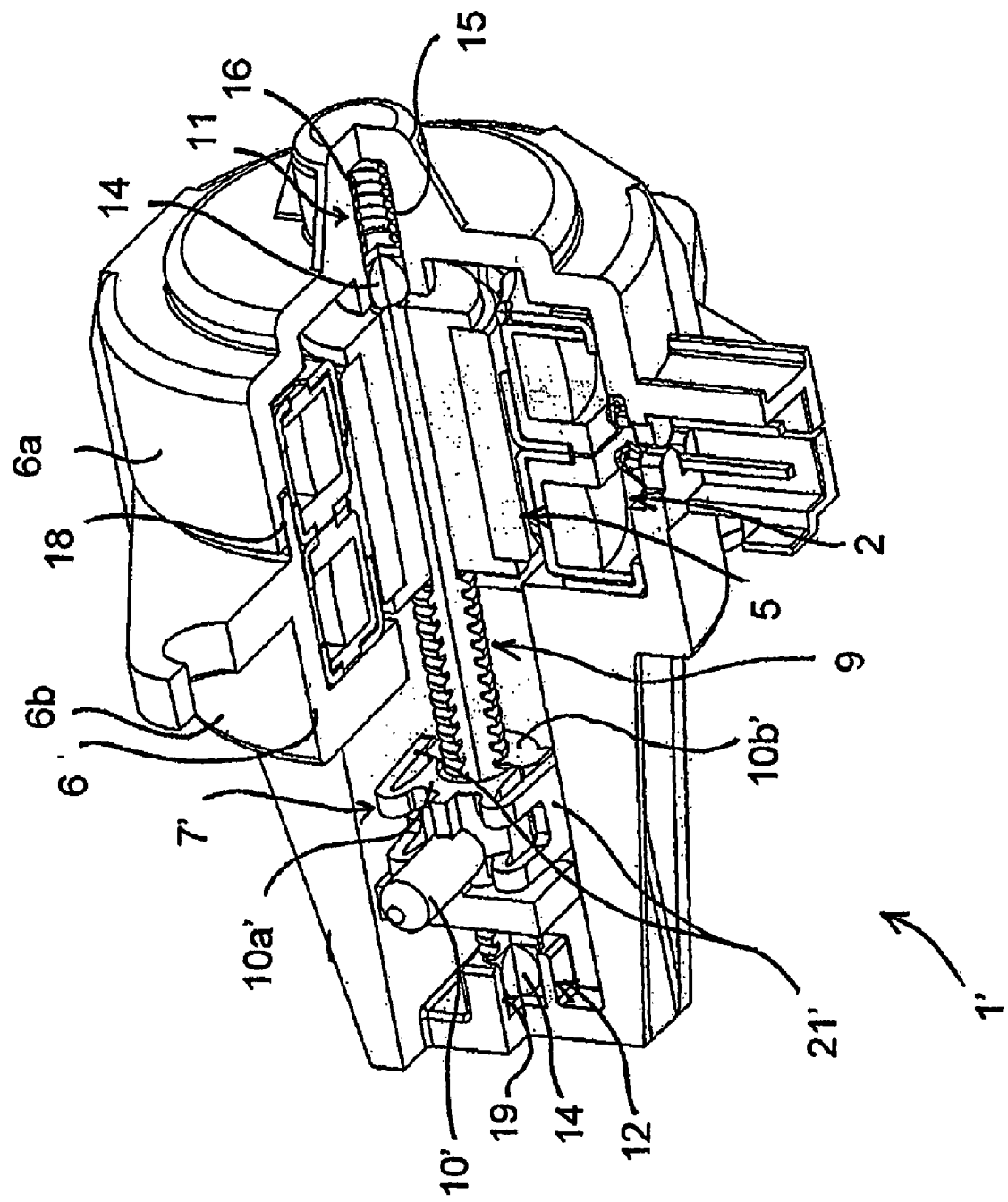
FIG. 2 is a sectional and perspective view of a linear actuator according to a second embodiment of the invention.

With more particular reference to the embodiment illustrated in FIGS. 1a, 1b, the linear displacement unit 10 is formed with two portions 10a, 10b, which are assembled on either side of the screw 9, both portions being rigidly attached together around the screw. The nut portions 8a, 8b of the linear displacement unit 10, therefore each have threaded portions which, once they are assembled, form a continuous thread complementary to the thread of the screw. Both portions of the linear displacement unit may be formed as separate parts or as a single part with a hinge. Both parts may be provided with attachment means 21, 22 as elastic clips and/or pins 23 to be fitted into complementary holes 24, these means being integrally formed with the portions of the unit 10, preferably in injected plastic material. Thus, both portions of the linear displacement unit may be assembled around the screw very rapidly, simply and in an automated way, even once the rotor has been assembled in the housing.

Figure 3:
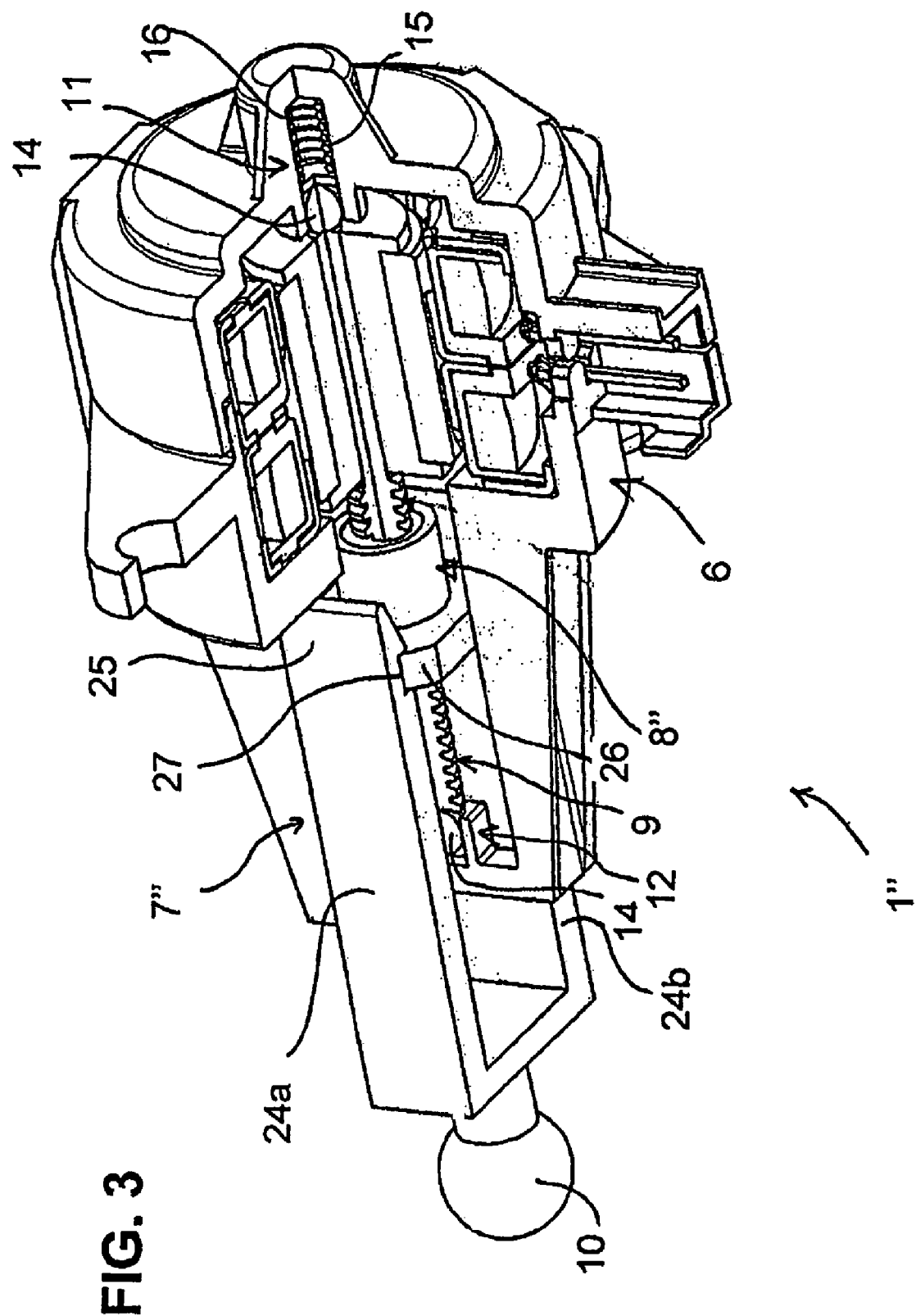
FIG. 3 is a sectional and perspective view of a third embodiment of the invention.

With reference to FIG. 3, in another alternative, the linear displacement unit 7" comprises a nut portion 8" and a coupling portion 10 comprising arms 24a, 24b which are attached at their free ends 25 to a bracket 26 of the nut portion 8". In the illustrated example, the arms 24a, 24b are elastic and are assembled by clips on the bracket 26 of the nut portion 8" which is received into the groove 27 at the end 25. The nut portion 8" may thus be pre-mounted on the screw 9 and assembled in the housing 6, the coupling portion 10 then being attached after assembling the housing on the rotor.

The invention claimed is:

1. A linear actuator comprising a housing, a motor comprising a stator, a screw-nut system, and a rotor axially and radially supported on a motor side by a bearing, the bearing comprising a ball rigidly attached to one end of the rotor, a bearing cavity formed or positioned in the housing into which the ball is inserted, and an axial stop positioned in the bearing cavity in abutment at essentially one point against the ball in an axial direction of the rotor.

2. The actuator according to claim 1, wherein the ball is spherical.

3. The actuator according to claim 1, wherein the ball is welded to the rotor.

4. The actuator according to claim 1 further including a second bearing comprising a second ball integral with or attached to an end of a screw portion of the screw-nut system, a cavity into which the ball is inserted, and a second axial stop positioned in the second bearing cavity in abutment at essentially one point against the second ball in an axial direction of the rotor.

5. The actuator according to claim 1, wherein a spring is received in the cavity of at least one of said bearings and exerts an axial force against the corresponding ball in order to suppress axial play of the screw-nut system.

6. The actuator according to claim 1, wherein each said stop is in comprises an insert in a hard material.

7. The actuator according to claim 1, wherein the linear displacement unit comprises at least two portions assembled on either side of a screw portion of the screw-nut system.

8. The actuator according to claim 7, wherein said at least two portions of the linear displacement unit are made of an injected plastic material and are provided with attachment means in the form of elastic arms or pins and complementary holes which are fastened with clips or attached automatically when both portions are brought closer to each other around the screw portion.

9. The actuator according to claim 1, wherein the housing comprises at least two portions assembled in an axial direction around the stator and having a coaxial interface around the motor portion.

10. Automobile headlight adjustment actuator, comprising a linear actuator, the linear actuator comprising a housing, a motor comprising a stator, a screw-nut system, and a rotor axially and radially supported on a motor side by a bearing, the bearing comprising a ball rigidly attached to one end of the rotor, a bearing cavity formed or positioned in the housing into which the ball is inserted, and an axial stop positioned in the bearing cavity in abutment at essentially one point against the ball in an axial direction of the rotor.

11. A linear actuator comprising a housing, a motor comprising a stator, a screw-nut system, and a rotor axially and radially supported on a motor side by a bearing, the bearing comprising a ball rigidly attached to one end of the rotor, a bearing cavity formed or positioned in the housing into which the ball is inserted, and an axial stop positioned in the bearing cavity in abutment at essentially one point against the ball in an axial direction of the rotor, the actuator further including a second bearing comprising a second ball integral with or attached to an end of a screw portion of the screw-nut system, a cavity into which the ball is inserted, and a second axial stop positioned in the second bearing cavity in abutment at essentially one point against the second ball in an axial direction of the rotor.

12. The actuator according to claim 11, wherein the ball is spherical.

13. The actuator according to claim 11, wherein the ball is welded to the rotor.

14. The actuator according to claim 11, wherein a spring is received in the cavity of at least one of said bearings and exerts an axial force against the corresponding ball in order to suppress axial play of the screw-nut system.

15. The actuator according to claim 11, wherein each said stop is in comprises an insert in a hard material.

16. The actuator according to claim 11, wherein the linear displacement unit comprises at least two portions assembled on either side of a screw portion of the screw-nut system.

17. The actuator according to claim 16, wherein said at least two portions of the linear displacement unit are made of an injected plastic material and are provided with attachment means in the form of elastic arms or pins and complementary holes which are fastened with clips or attached automatically when both portions are brought closer to each other around the screw portion.

18. The actuator according to claim 11, wherein the housing comprises at least two portions assembled in an axial direction around the stator and having a coaxial interface around the motor portion.

19. Automobile headlight adjustment actuator comprising a linear actuator according to claim 11.

* * * * *